United States Patent [19] [11] Patent Number: 4,933,882
Molnar et al. [45] Date of Patent: Jun. 12, 1990

[54] REGIME RECOGNITION

[75] Inventors: George A. Molnar, Orange; Lawrence I. Prince; Paul A. Johnson, both of Hamden, all of Conn.

[73] Assignee: United Technologies Corporation, Hartford, Conn.

[21] Appl. No.: 267,204

[22] Filed: Nov. 4, 1988

[51] Int. Cl.$^5$ .............................................. G06F 15/50
[52] U.S. Cl. ............................. 364/550; 364/551.01; 364/424.03; 340/945; 371/29.1
[58] Field of Search ........................ 364/424.01, 424.03, 364/550, 551.01; 340/945, 984; 360/25; 369/21, 53; 371/21, 29

[56] References Cited

U.S. PATENT DOCUMENTS

| | | | |
|---|---|---|---|
| 3,702,989 | 11/1972 | Provenzano, Jr. et al. | 340/172.5 |
| 4,212,064 | 7/1980 | Forsythe et al. | 364/424.03 |
| 4,270,168 | 5/1981 | Murphy et al. | 364/200 |
| 4,409,670 | 10/1983 | Herndon et al. | 364/900 |
| 4,470,116 | 9/1984 | Ratchford | 364/424 |
| 4,621,335 | 11/1986 | Bluish et al. | 364/550 |
| 4,646,241 | 2/1987 | Ratchford et al. | 364/424 |
| 4,679,808 | 7/1987 | Ito et al. | 364/424.01 |
| 4,720,806 | 1/1988 | Schippers et al. | 364/551.01 |
| 4,729,102 | 3/1988 | Miller, Jr. et al. | 364/424 |
| 4,757,454 | 7/1988 | Hisatake et al. | 364/424.03 |
| 4,787,053 | 11/1988 | Moore | 364/550 |
| 4,805,089 | 2/1989 | Lane et al. | 364/551.01 |

Primary Examiner—Parshotam S. Lall
Assistant Examiner—Brian M. Mattson
Attorney, Agent, or Firm—Richard H. Kosakowski

[57] ABSTRACT

System operating regimes are identified by dividing a range of each one of a plurality of sensed system parameters into a plurality of predetermined range segments, assigning an alphanumeric character to each range segment of each parameter, and generating a composite number, each digit of which is made up of one of the alphanumeric range segment characters of each parameter. Apparatus compares the current sensed values of each parameter to the corresponding predetermined range segments to determine the current range segment of each sensed parameter, generates a current composite number made up of the current range segments of all of the parameters, and compares the current composite number to a plurality of predetermined system operating regimes to determine if the current composite number identifies one of a plurality of system operating regimes. The current composite number is converted to a base ten equivalent to facilitate the comparison of the current composite number to the plurality of system operating regimes.

14 Claims, 3 Drawing Sheets

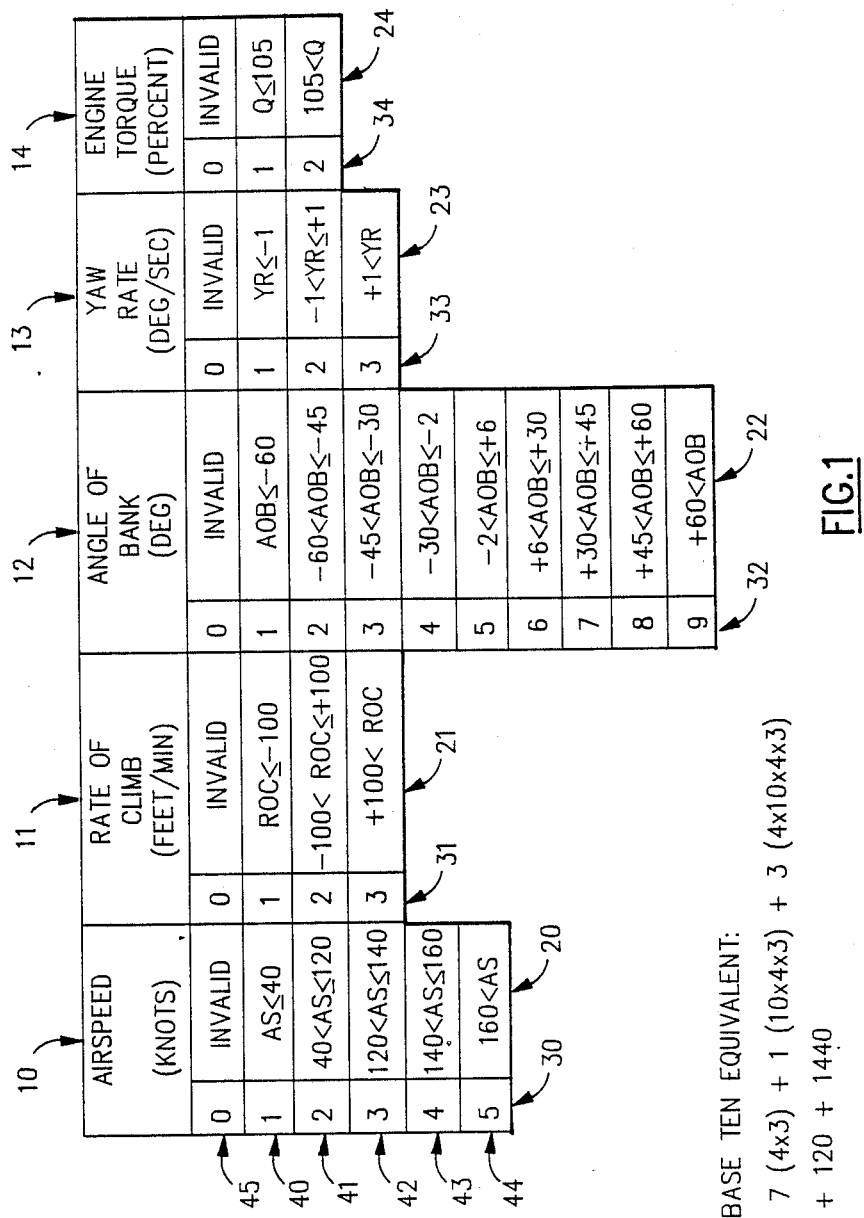

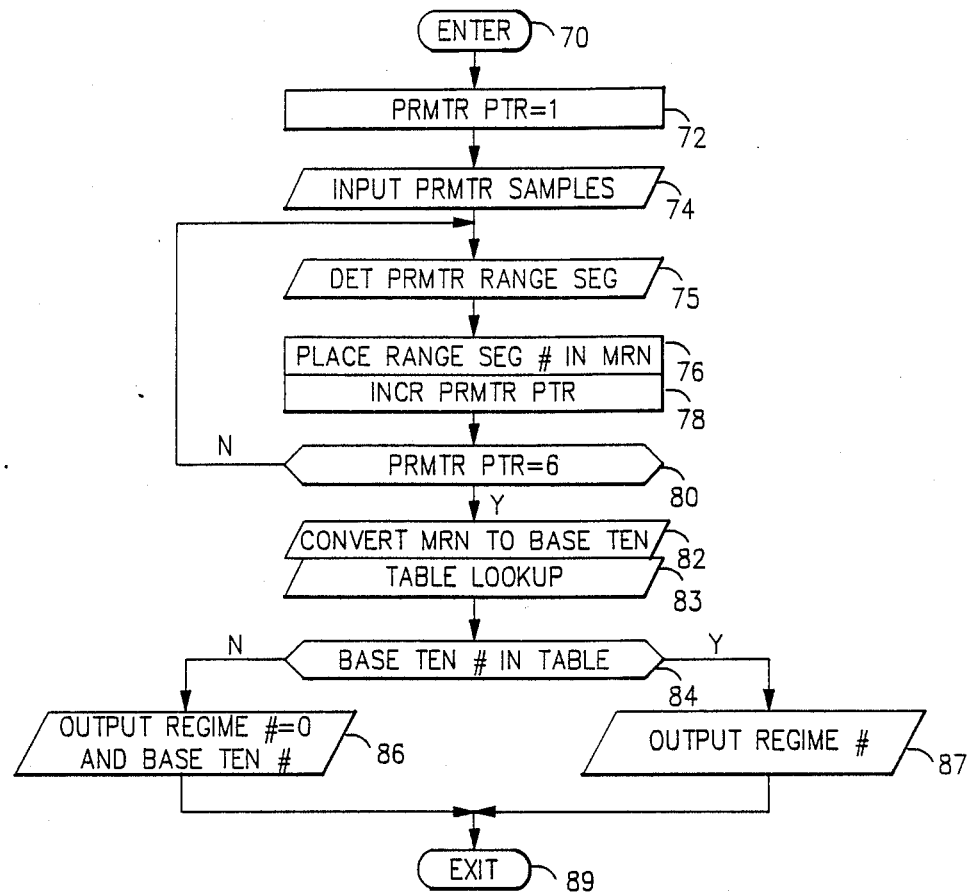

REGIME RECOGNITION

This invention was made with Government support under Contract N00019-84-G-0203 Job Order LF003 awarded by the Department of the Navy. The Government has certain rights in this invention.

DESCRIPTION

1. Technical Field

This invention relates to data identification, and more particularly to identifying regimes of system operation based on ranges of parameter values.

2. Background Art

In studying different types of systems, it is often desired to ascertain the attainment of, and duration of time spent in, certain regimes (modes) of operation. As an example, rotorcraft flight regimes are monitored to determine the useful life of structural components utilized in the rotorcraft. It is known to have either a pilot or observer in the rotorcraft estimate, at the completion of the flight, the time spent in each regime during the flight. However, the resulting log suffers from inaccuracies and lack of detail.

One solution has been to use automatic, continuous data recording and to perform regime recognition manually after the flight. Here, a flight expert analyzes the parameter data stored either on tape or in memory to determine attained flight regimes. However, the problem with recording data for later analysis is that a large amount of memory is required to continually record time histories of all the required parameters during the flight. Also, the expertise of the analyst can introduce inconsistencies from flight to flight.

To overcome the problems associated with manual analysis of recorded data, it is known in the prior art to automatically recognize modes of operation by selectively recording parameter data according to parameter value. For example, in U.S. Pat. No. 4,409,670 to Herndon et al., sensed aircraft flight parameter data is recorded in response to certain command situations, either by operator request or by certain parameter conditions. Data is also recorded at slow periodic sample rates and at parameter exceedences. In this way, an accurate log of flight modes attained by the craft during flight is produced, while the amount of memory required to store the flight history is reduced to a realizable level. As a second example, in U.S. Pat. No. 3,702,989 to J. Provenzano, Jr., et al., a method and apparatus is disclosed for selective data handling that can be adapted to environments other than flight. In one aspect of that art, parameter data is analyzed for significance according to adaptive criteria. The criteria selection is dependent upon modes or conditions indicated by values of the parameters being handled by the apparatus. In this way, the operational history of the system being monitored can be documented.

In the above-mentioned prior art, the data parameters identified as significant are stored during system operation for later analysis. As the parameters of interest increase in number, the size, sophistication, and cost of the data recorder required often reach prohibitive levels. In applications such as rotorcraft, there exists twenty parameters or more to be monitored and hundreds of regimes of interest. Yet the onboard data recorder must meet stringent size and weight requirements. One known solution for regime recognition in this case would be computer code executing a complex decision tree whereby the current regime is arrived at by a repetitive decision-making process based on the examination of key parameter values. However, it is desired to avoid this complex repetitive process for two reasons: one is that of software maintainability problems when regimes are added or deleted; a second is that of implementation problems in that, compared to the regime recognition apparatus of the present invention, a significantly greater amount of time is required during the computer code debugging phase to test all possible parameter combinations for each regime. Any attempt to save time by limiting the scope of parameter combination testing necessarily limits the degree of confidence in the ability of the repetitive decision-making process to identify every regime.

DISCLOSURE OF INVENTION

Objects of the present invention include identifying a regime of system operation from the present values of a plurality of sensed parameters resulting in a minimal amount of stored data.

According to the present invention, a regime is identified by dividing a range of each one of a plurality of sensed parameters into a plurality of range segments related to a plurality of system regimes, assigning an alphanumeric character to each range segment of each parameter, and generating a composite number, each digit of which is comprised of one of the alphanumeric range segment characters of each parameter, whereby the composite number is unique so as to identify one of a plurality of regimes.

In further accord with the invention, the composite number is converted to a single base equivalent to both compress the number for ease of data manipulation and to facilitate a regime look up procedure.

Other objects, features and advantages of the present invention will become more apparent in light of the following detailed description of exemplary embodiments thereof, as illustrated in the accompanying drawing.

BRIEF DESCRIPTION OF DRAWING

FIG. 1 is a table of five typical rotorcraft parameters divided into desired range segments of interest along with corresponding integers assigned thereto;

FIG. 2 is a table of the five typical rotorcraft parameters of FIG. 1 arranged in a mixed radix number format together with associated radices and range segment numbers;

FIG. 3 is an illustration of the conversion from the exemplary mixed radix number of FIG. 2 to a base ten equivalent;

FIG. 4 is a flowchart of a computer routine for recognizing regimes in accordance with the present invention.

BEST MODE FOR CARRYING OUT THE INVENTION

Figure 5:
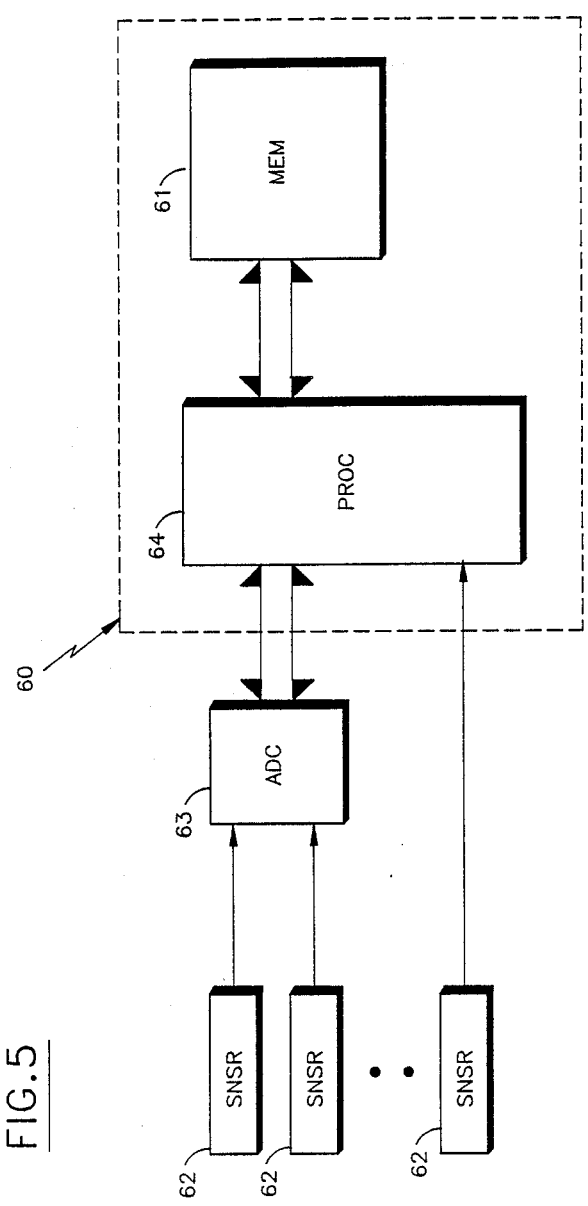
FIG. 5 is a schematic block diagram of regime recognition apparatus of the present invention for implementing the flowchart of FIG. 4.

In the exemplary embodiment of the regime recognition apparatus of the present invention, typical regimes of rotorcraft flight are utilized. The regime recognition apparatus of the present invention contemplates two different implementation phases: a preliminary phase in which the user determines, inter alia, the desired regimes, parameters, and parameter range segments; and a second phase in which regimes are identified in a dynamic parameter environment.

Initially, the regimes (R) to be recognized are listed in an orderly fashion by grouping related regimes together. As an example, all types of rotorcraft turn regimes are grouped together, with the turns being further categorized into subgroups, such as turns associated with different rotorcraft speeds, (e.g. low speed left turn, low speed right turn, cruise speed left turn, cruise speed right turn, high speed left turn, high speed right turn, etc.). Creating the orderly list is not required; however, it helps in keeping track of regimes and also helps to prevent leaving out any regimes. Once a list of regimes is completed, the regimes are numbered (R#) sequentially with integers beginning with a first regime and continuing up through a last (Nth) regime.

Next, the parameters defining each of the listed regimes are determined. The parameter values are normally the usable values of those either input from system sensing devices or derivations thereof. Once the parameters are determined, the respective parameter ranges of interest, required to differentiate the desired regimes, are determined. The division of each parameter into an arbitrary number of range segments is normally undertaken with consideration as to the relationship of certain parameter values to different regimes. Also, the range segments are chosen to be contiguous and non-overlapping. In the case of continuous analog parameter signals (e.g. airspeed), the usable range of the parameter is divided into a number of smaller range segments. Similarly, for discrete state parameters (e.g. a turn indicator), the range segments are the usable parameter states.

Each range segment chosen is then assigned an alphanumeric character; specifically, an integer. Illustrated in FIG. 1, columns 10-14, are five typical rotorcraft parameters along with their respective units of measurement:

Airspeed (AS) in knots;
Rate of climb (ROC) in feet per minute;
Angle of bank (AOB) in degrees;
Yaw rate (YR) in degrees per second;
Engine torque (Q) in percent.

Each of the five parameters is divided into range segments of interest (subcolumns 20-24) and the corresponding range segments of each parameter are assigned integers (subcolumns 30-34). For example, airspeed (column 10) is divided into five range segments of interest and assigned integers as follows: $AS \leq 40$ knots is assigned 1 (row 40); $40 < AS \leq 120$ knots is assigned 2 (row 41); $120 < AS \leq 140$ knots is assigned 3 (row 42); $140 < AS \leq 160$ knots is assigned 4 (row 43); and $160 < AS$ is assigned 5 (row 44). Zero is assigned to an invalid airspeed range (row 45). The airspeed parameter range segment delineations are exemplary and are chosen with regard to the aforementioned regimes. Integers are assigned to the range segments (including zero to an invalid range segment) of the other four parameters of interest in a similar manner. Assigning the integer zero to an invalid range segment of a parameter is predicated on the fact that the parameter could achieve invalid conditions such as, for an example of an analog parameter, an out of range low condition, an out of range high condition, or a condition of too rapid a change within the valid parameter range.

After assigning integers to the range segments, each parameter is assigned a radix number, RX, that equals the number of range segments, including the invalid range segment, for each parameter. As an example, the airspeed parameter of FIG. 1 has a radix number of six. Similarly, the radix numbers for the parameters ROC, AOB, YR, and Q are four, ten, four, and three, respectively. Illustrated in FIG. 2, row 46, are the aforementioned exemplary rotorcraft parameters along with their corresponding radix numbers (row 47).

At this point, a determination is made as to the proper range segment for each parameter in order to define each of the identifiable regimes chosen hereinbefore. For example, a medium-speed-descent right turn regime might require that the airspeed parameter be approximately 130 knots. Therefore, according to FIG. 1, the range segment of interest would be $120 < AS \leq 140$ knots (range segment=3). The required range segments for the remaining four parameters of interest are determined for the exemplary regime of a medium-speed-descent right turn in a similar manner (all parameter values are exemplary): ROC=−150 (range segment=1); AOB=+40 (range segment=7); YR=+1.5 (range segment =3); and Q=110 (range segment=2). This procedure of determining the proper parameter range segments for a regime is repeated for each of the identifiable regimes chosen hereinbefore.

It is possible for a regime to have a plurality of range segment definitions. For example, a particular type of turn regime might tolerate values for airspeed between 100 and 130 knots. Thus, the turn regime would be defined, in a first instance where $100 < AS \leq 120$ knots, with AS having a range segment of two ($40 < AS \leq 120$), or, in a second instance where $120 < AS \leq 130$ knots, with AS having a range segment of three ($120 < AS \leq 140$). Thus, with the other four parameters having values for a turn regime within a single range segment, the turn regime would have two airspeed range segment definitions.

After the parameter range segments are determined for a particular regime, the resulting range segment integers are assembled to form a composite number known as a mixed radix number. The reason for describing the composite number as a mixed radix number is that, more often than not, the radix numbers, RX, (i.e. the number of range segments that each parameter is divided into) will not be the same. As illustrated in FIG. 2, row 47, the radix numbers for the five exemplary parameters are not all the same. However, it is possible for the range of every parameter to be delineated in an equal number of range segments.

The aforementioned step of assembling the range segments of each parameter into a mixed radix number is repeated for each regime determined hereinbefore. In forming the mixed radix number for each regime, each parameter is assigned to a digit position within the mixed radix number. For example, illustrated in FIG. 2, row 46, is a mixed radix number arrangement of the five exemplary rotorcraft parameters. The most significant digit (MSD) of the mixed radix number is the range segment integer of the airspeed parameter (column 50). Next is that of rate of climb (column 51), then angle of bank (column 52), then yaw rate (column 53), and engine torque (column 54), which comprises the least significant digit (LSD) of the mixed radix number. The radices associated with each parameter are illustrated in row 47. Once assigned to a first regime, the placement of each parameter's segment numbers in digit positions of the mixed radix number is held constant for all regimes. Then, when the parameter values change during system operation, the resulting mixed radix number computed at any instance in time is unique so as to identify the current rotorcraft flight regime.

Next, the mixed radix number for each regime is converted into a single base equivalent; specifically, a base ten equivalent. The conversion from the mixed radix format to a base ten number is comprised of a series of multiplication and addition operations, as exemplified in FIG. 3, whereby the current Q range segment integer is added to the product of the current YR integer and the Q radix; the result is added to the product of the current AOB integer, the Q radix, and the YR radix; the result is added to the product of the current ROC integer, the Q radix, the YR radix, and the AOB radix; and finally the result is added to the product of the current AS integer, the Q radix, the YR radix, the AOB radix, and the ROC radix. In general, the equation for converting the mixed radix number to its base ten equivalent is as follows:

$$S_1 + S_2*(RX_1) + S_3*(RX_1*RX_2) + S_4*(RX_1*RX_2*RX_3) + \ldots + S_z+(RX_1*RX_2*RX_3 \ldots RX_{z-1})$$

where:
  $S_1$ is the segment number of the parameter sample occupying the LSD of the mixed radix word;
  $S_z$ is the segment number of the parameter sample occupying the MSD of the mixed radix word;
  $RX_1$ is the radix of the parameter sample occupying the LSD of the mixed radix word;
  $RX_{z-1}$ is the radix of the parameter sample occupying the bit position of the mixed radix word that is one less than the MSD.

In a similar manner, the mixed radix number for each regime is converted to its base ten equivalent. The resulting base ten number computed for a particular regime is then associated with the corresponding regime number (R#) in the list of desired regimes chosen hereinbefore. Once all of the regimes in the list are associated with their corresponding base ten numbers, the list is sorted into ascending order of base ten numbers.

At this point, the preliminary implementation phase is complete; regimes can now be recognized in a dynamic rotorcraft parameter environment.

FIG. 4 is a flowchart illustrating the software routine performed by a data recorder 60 (FIG. 5) in recognizing regimes. As an example, assume the data recorder 60 is comprised of an on-board, computer-based flight recorder executing the software coded routine of FIG. 4. Also, assume the flight recorder is utilizing the five exemplary parameters (i.e. AS, ROC, AOB, YR, Q) for regime recognition. The list of regimes, determined during the preliminary implementation phase, is stored in memory 61 (FIG. 5) for manipulation by the software of FIG. 4.

Beginning after an enter step 70 in FIG. 4, a parameter pointer is initialized, in a step 72, to a value of one to point to the first of the five parameters sampled on a regular basis by the flight control. The data recorder 60 next inputs the parameter samples in a subroutine 74. The parameter values are normally input through sensing devices 62 and can either be analog signals or discrete signals. Analog signals must first be converted to a digital format, typically by an analog to digital converter 63, for use with a digital flight recorder 60; discrete signals typically are input directly to the data recorder. The subroutine 74 inputs the parameter samples using well known methods such as reading the parameter values either directly at the analog to digital converter 63 output, after the signals have been routed through a multiplexing scheme, or after they have undergone signal conditioning. The parameter values input in the subroutine 74 also can be derivatives of the sensed values.

Next, the parameter pointed to by the parameter pointer (initially pointing to Q, the first of the five parameters) has its value examined, in a subroutine 75, to determine which range segment the parameter value is in. The subroutine 75 varies for each parameter due to the arbitrariness with which the usable range of each parameter is delineated by the user in the preliminary implementation phase. The integer assigned to the current parameter range segment is then placed, in a step 76, into the mixed radix number in a digit position indicated by the parameter pointer (initially pointing to the first digit (LSD) of the mixed radix number). Next, the parameter pointer is incremented, in a step 78, to indicate the next sampled parameter to be compared with its range segments. A determination is then made in a test 80 as to whether all five of the parameters have had their current sample range segment numbers determined by the subroutine 75 and placed into the mixed radix number in the step 76. If parameters remain, then the program branches back to the subroutine 75 and executes the subroutine 75, the steps 76, 78, and the test 80 in a loop until all of the parameters have been exhausted.

Once all of the parameters have been exhausted, then the mixed radix number is converted to a base ten equivalent, in a subroutine 82, to facilitate identification of the current regime of rotorcraft flight. The resulting base ten number is used to identify, by means of a table lookup procedure in a subroutine 83, the current regime from the list of regimes stored in memory. The base ten number generated in the subroutine 82 is then compared, in a test 84, to the regime base ten number returned in the subroutine 83. However, not all mixed radix numbers, and relatedly, not all base ten equivalents generated by the subroutine 82, will correspond to a rotorcraft flight regime that is considered in the preliminary implementation phase. In these instances, the subroutine 83 will not return an identifiable flight regime from the list in memory. Instead, the subroutine 83 will return a regime number of zero signifying that no identifiable regimes were found. This non-identifiable regime number of zero, along with the corresponding base ten number generated in the subroutine 82, are output by the routine, in a step 86, for further data manipulation. The base ten equivalent output in the step 86 can be converted, if desired, at a later time back into its mixed radix equivalent to yield the range segments of each parameter. In this way, rotorcraft personnel can get a better understanding of rotorcraft modes of operation.

The identifiable regimes returned by the subroutine 83 are output from the routine, in a step 87, in the form of the regime numbers (R#) determined hereinbefore in the preliminary implementation phase. The data recorder 60 can, as examples, store the identifiable regime numbers output in the step 87, or it can manipulate the codes in a further manner. For example, the data recorder can form a table of the amount of time the rotorcraft spends in each of the recognized regimes, where the amount of time is derived, e.g. from the number of times the routine of the flowchart of FIG. 4 is executed during the flight. By storing only regimes, the amount of memory 61 required in the data recorder is greatly reduced from that of a system which stores actual parameter values. As a final step, the routine exits in a step 89.

As a specific example, assume at one instance in time the rotorcraft is traveling at an airspeed of 130 knots, descending at a rate of 150 feet per minute, turning right at a 40 degree angle of bank, executing a coordinated turn with a yaw rate of 1.5 degrees per second, and demanding 110 percent engine torque. The above parameter values are input to the data recorder 60 in the subroutine 74. As per FIG. 1, the resulting range segment integer for airspeed is 3, that of rate of climb is 1, that of angle of bank is 7, that of yaw rate is 3, and that of engine torque is 2. As illustrated in a row 90 of FIG. 2, the resulting range segment values are assembled in the mixed radix number, in step 76 of FIG. 4, to yield the result of 31732. As illustrated in FIG. 3, the mixed radix number of 31732 is then converted to its base ten equivalent in the subroutine 82 of FIG. 4. The table look up procedure of the subroutine 83 then looks for the base ten equivalent, 1655, in the table and returns the regime number associated with that base ten equivalent. If an identifiable regime is found in memory, as determined by the test 84, the routine outputs the corresponding regime number (R#) in the step 87. If an identifiable regime cannot be found in the regime list, then the routine outputs, in the step 86, the regime number of zero and also the base ten equivalent. The routine then exits in the step 89.

In a representative application, the regime recognition apparatus of the present invention is implemented, in a structural usage monitor (60 FIG. 5) The monitor 60 is a computer-based device that resides on the rotorcraft and interfaces with existing sensors 62. Software inside the monitor that implements the flowchart of FIG. 4 is coded in a suitable high level programming language (e.g. ADA) and executed, using a MIL-STD-1750A Processor 64, at regular intervals during the rotorcraft flight. The monitor stores both the identifiable regimes and the unidentifiable regime information (regime number=0, along with the base ten equivalent), and, in both cases, the time spent in the regime for later analysis.

The regime recognition apparatus of the present invention can also be implemented within one or two digital flight control computers of the type described in commonly-owned U.S. Pat. No. 4,270,168 to Murphy et al. The flowchart of FIG. 4 of the present invention may be performed in the real time maintenance routines 607a of FIG. 6 of the aforementioned patent.

Although the invention has been illustrated as being implemented in rotorcraft for the identification of flight regimes, the invention may be implemented in any type of system that monitors a plurality of system parameters for ascertainment of system operational modes attained. Other application examples include fixed wing aircraft or non-aircraft applications such as industrial machine processes. The invention is described as being implemented with five parameters of interest; however, any practical number of desired parameters may be utilized. The constraining factors in determining the number of parameters of interest include processing sophistication, memory size, and data recorder physical device size, weight, and cost.

Also, the parameter placement in the digits of the mixed radix number is not constrained to be that of FIG. 2 (i.e. AS in MSD, ROC in MSD−1, etc.). Any arrangement of parameters within the mixed radix number can be chosen (e.g. Q in MSD, AOB in MSD−1, YR in MSD−2, AS in LSD+1, ROC in LSD). As illustrated, each parameter is divided into a specific number of ranges of interest at certain specific parameter value boundaries. For example, airspeed is illustrated divided into six ranges of interest. However, parameters can be delineated at any number of arbitrary boundary points within the usable parameter range, such that the resulting range segments are non-overlapping.

As illustrated, the mixed radix number is converted to a base ten equivalent, in both the preliminary implementation phase and the dynamic parameter phase, in order to facilitate table lookup of regime codes. However, it is not necessary to convert to a base ten equivalent specifically; any base number can be chosen. Also, the base ten conversion steps are used strictly to aid the computer software in identifying regime codes contained in a list stored in memory. Therefore, if regimes were labeled in a table by way of their composite numbers (e.g. mixed radix numbers), then the base ten conversion step would not be needed in both of the aforementioned phases. However, this would make looking up the mixed radix number a slower, more complicated process. Also, a table look up procedure is illustrated for identifying listed regimes. However, any appropriate method can be used to identify a regime from a list of regimes.

As described, the table lookup of the subroutine 83 returns a regime code of zero if the resulting base ten equivalent of the current mixed radix number cannot be located in the regime list. This unidentifiable regime code of zero is then output in the step 86. However, step 86 instead may output, if desired, the base ten equivalent for further manipulation. For example, the base ten equivalent may be appended to the regime list in memory and also, if desired, have its elapsed time associated therewith. This helps to identify regimes not originally thought to be important or originally omitted from the list during the preliminary implementation phase.

As illustrated, the range segments for each parameter are assigned integer values. However, any alphanumeric character can be used to uniquely designate the range segments. Integers are used in the exemplary embodiment to facilitate the implementation of the base ten conversion scheme. Also, an integer is assigned to all invalid parameter states. However, it is not necessary to the invention to assign any alphanumeric characters to invalid ranges (i.e. it is not necessary to consider invalid ranges). Also, if it is desired to interpret invalid parameter ranges, a single alphanumeric character could be assigned to each invalid range, or the invalid ranges could be included in the valid parameter ranges. It is sufficient that a range of the parameter be chosen such that the division of the range into range segments allows regime definition.

It is contemplated in the exemplary embodiment that a user manually perform the steps of the preliminary implementation phase (e.g. dividing the range of each parameter into range segments, assigning alphanumeric values thereto, etc.). However, the aforementioned steps are not constrained to be performed manually; they can be performed under computer control in a manner that should be apparent to those skilled in the art. All of the foregoing changes and variations are irrelevant to the invention, it suffices that regimes are identified by dividing the range of each one of a plurality of parameters into range segments, assigning an alphanumeric character to each range segment, and assembling the range segment of each parameter, as represented by one of the alphanumeric characters, into a composite number, whereby the composite number is unique so as to identify the regime of operation.

Although the invention has been illustrated and described with respect to exemplary embodiments thereof, it should be understood by those skilled in the art that the foregoing and various other changes, omissions and additions may be made therein and thereto, without departing from the spirit and scope of the invention.

We claim:

1. Apparatus for identifying operating regimes of a system, comprising:

sensor means, responsive to a plurality of system parameters, for providing for each of said system parameters a sensed parameter signal indicative of a magnitude of said sensed parameter; and signal processing means, responsive to said sensed parameter signals, for providing for each of said system parameters a plurality of segment signals indicative of signal magnitude range segments of said system parameter, for comparing the magnitude of each of said sensed parameter signals to corresponding ones of said segment signals, for providing for each of said system parameters a current range segment signal indicative of one of said segment signals within which the magnitude of said sensed parameter signal falls, and for providing a composite signal comprised of each of said current range segment signals, said composite signal uniquely identifying a selected one of the operating regimes.

2. The apparatus of claim 1, wherein said signal processing means further comprises means responsive to said composite signal for providing a selected one of a plurality of regime signals, each of said regime signals being indicative of the corresponding selected one of said plurality of the operating regimes.

3. The apparatus of claim 2, wherein said signal processing means further comprises means of periodically comparing the magnitude of each of said sensed parameter signals to the corresponding ones of said segment signals, for providing for each of said system parameters a current range segment signal indicative of the one of said segment signals within which the magnitude of said sensed parameter signal falls, for providing a current composite signal comprised of each of said current range segment signals, and for comparing said current composite signal to said regime signals to determine if said current composite identifies one of the operating regimes, whereby each said current composite signal corresponds to one of said regime signal whereas each said regime signal corresponds to at least one of said current composite signals.

4. The apparatus of claim, wherein said signal processing means further comprises means for providing at least one signal indicative of an identifiable system operating regime when said current composite signal is determined to be similar to one of said regime signals.

5. The apparatus of claim 3, wherein said signal processing means further comprises means for providing at least one signal indicative of a non-identifiable system operating regime when said current composite signal is determined not to be similar to one of said regime signals.

6. The apparatus of claim 3, wherein said signal processing means further comprises means for converting said current composite signal into a single base equivalent signal, whereby said conversion facilitates said comparison of said current composite signal to said regime signals.

7. The apparatus o claim 6, wherein said signal processing means further comprises means for converting said current composite signal into a base ten equivalent signal, whereby said conversion facilitates said comparison of said current composite signal to said regime signals.

8. The apparatus of claim 1 wherein said signal processing means further comprises means for providing a segment signal for each of any of said parameters having at least one invalid range segment.

9. The apparatus of claim 8, wherein said signal processing means further comprises means for assigning an alphanumeric character to any of said segment signals indicative of invalid range segments.

10. The apparatus of claim 9, wherein said signal processing means further comprises means for assigning an integer to any of said segment signals indicative of invalid range segments.

11. The apparatus of claim 1, wherein said signal processing means further comprises means for assigning an alphanumeric character to each of said segment signals.

12. The apparatus of claim 11, wherein said signal processing means further comprises means for assigning an integer to each of said segment signals.

13. The apparatus of claim 1, wherein the system is a rotorcraft.

14. The apparatus of claim 1, wherein said signal processing means further comprises means for providing segment signals indicative of non-overlapping range segments of said system parameters.

* * * * *

UNITED STATES PATENT AND TRADEMARK OFFICE
CERTIFICATE OF CORRECTION

PATENT NO. : 4,933,882

DATED : June 12, 1990

INVENTOR(S) : George A. Molnar, et al

It is certified that error appears in the above-identified patent and that said Letters Patent is hereby corrected as shown below:

Col. 10, claim 4, line 1, after "claim" insert --3--.
Col. 10, claim 7, line 1, change "o" to --of--.

Signed and Sealed this

Seventh Day of July, 1992

Attest:

DOUGLAS B. COMER

*Attesting Officer*     *Acting Commissioner of Patents and Trademarks*